United States Patent
Huang et al.

(10) Patent No.: US 7,884,564 B2
(45) Date of Patent: Feb. 8, 2011

(54) CONTROL CIRCUIT OF SENSORLESS MOTOR AND CONTROL METHOD THEREOF

(75) Inventors: Sheng-Hu Huang, Taoyuan Hsien (TW); Chun-Lung Chiu, Taoyuan Hsien (TW)

(73) Assignee: Delta Electronics, Inc., Taoyuan Hsien ( * ) Notice: Subject to any disclaimer, the term of this patent is extended or adjusted under 35 U.S.C. 154(b) by 433 days.

(21) Appl. No.: 12/028,654

(22) Filed: Feb. 8, 2008

(65) Prior Publication Data
US 2008/0278104 A1 Nov. 13, 2008

(30) Foreign Application Priority Data
May 11, 2007 (TW) .............................. 96116768 A

(51) Int. Cl.
*H02P 6/00* (2006.01)
(52) U.S. Cl. .............................. 318/400.29; 318/400.32
(58) Field of Classification Search ............ 318/400.29, 318/400.32, 400.34, 459, 500
See application file for complete search history.

(56) References Cited

U.S. PATENT DOCUMENTS

| | | | | |
|---|---|---|---|---|
| 5,032,781 A | * | 7/1991 | Kronenberg | 318/696 |
| 5,994,797 A | * | 11/1999 | Yamaoka | 307/125 |
| 6,458,164 B1 | * | 10/2002 | Weiss | 623/3.27 |
| 6,690,131 B1 | * | 2/2004 | Shimomura et al. | 318/445 |
| 6,861,817 B2 | * | 3/2005 | Pigott et al. | 318/685 |

* cited by examiner

*Primary Examiner*—Rina I Duda
(74) *Attorney, Agent, or Firm*—Birch, Stewart, Kolasch & Birch, LLP

(57) ABSTRACT

A control circuit of a sensorless motor includes a first coil, a second coil, a first switch circuit, a second switch circuit and an auxiliary switch circuit. The first switch circuit is electrically connected to the first coil and controls a direction of a current flowing through the first coil. The second switch circuit is electrically connected to the second coil and controls a direction of a current flowing through the second coil. The auxiliary switch circuit is electrically connected to and between the first coil and the second coil and controls the directions of the currents flowing through the first coil and the second coil by cooperating with the first switch circuit and the second switch circuit. A control method of a sensorless motor is also disclosed.

20 Claims, 6 Drawing Sheets

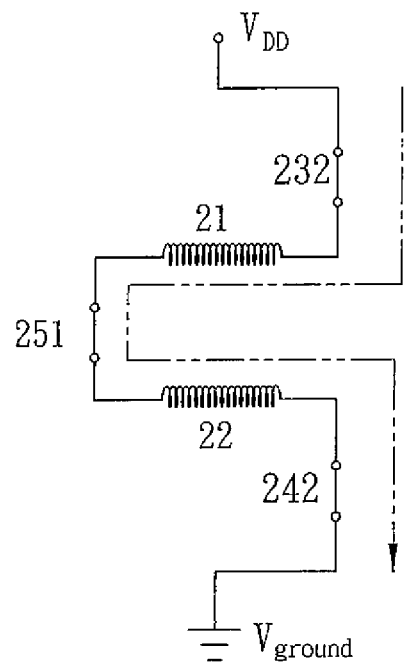
FIG. 8
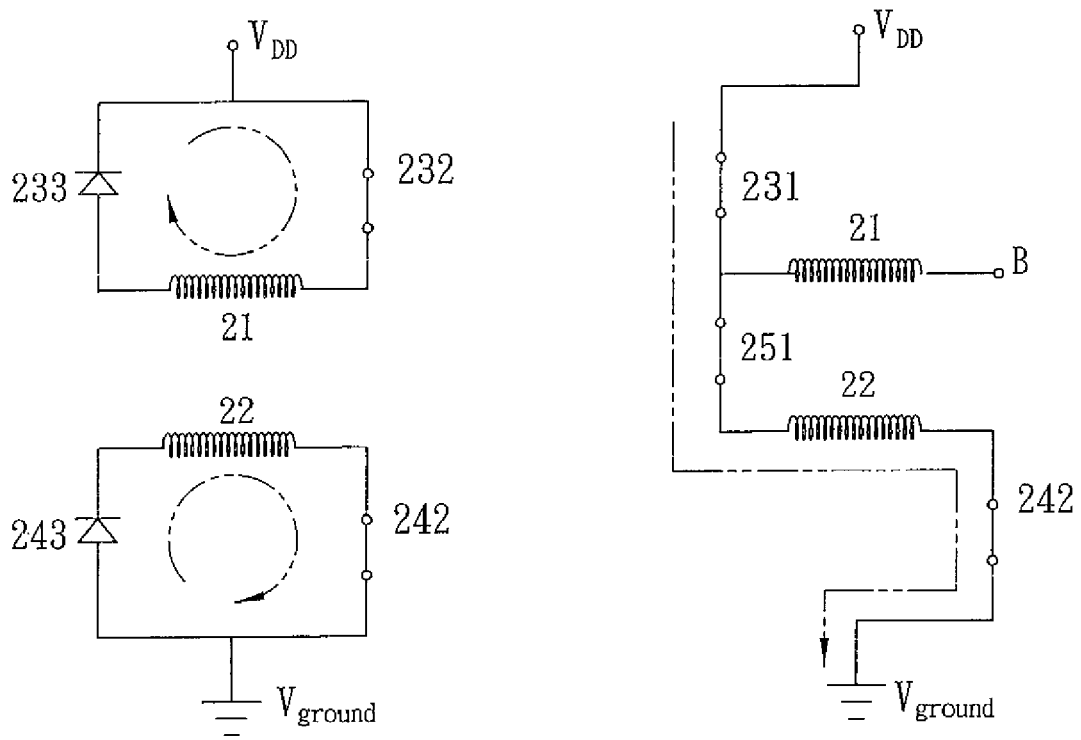
FIG. 9
FIG. 10

CONTROL CIRCUIT OF SENSORLESS MOTOR AND CONTROL METHOD THEREOF

CROSS REFERENCE TO RELATED APPLICATIONS

This Non-provisional application claims priority under 35 U.S.C. §119(a) on Patent Application No(s). 096116768, filed in Taiwan, Republic of China on May 11, 2007, the entire contents of which are hereby incorporated by reference.

BACKGROUND OF THE INVENTION

1. Field of Invention

The present invention relates to a control circuit, and in particular to a control circuit of a sensorless motor and a control method thereof.

2. Related Art

In general, a sensorless motor operates according to an induced electromotive force of an induction coil. FIG. 1 is a schematic illustration showing a conventional control circuit 1 of a sensorless motor. Referring to FIG. 1, the control circuit 1 includes a first switch element 11, a second switch element 12, a third switch element 13, a fourth switch element 14, a coil 15, a positive power input terminal $V_{DD}$ and a ground $V_{ground}$. The positive power input terminal $V_{DD}$ supplies the power required by the control circuit 1.

The coil 15 is disposed around several silicon steel sheets (not shown) of the motor, and the currents flow through the coil 15 via different directions so that the silicon steel sheets generate different magnetic forces to repel a magnetic pole of a rotor of the motor so as to push the rotor. The control circuit 1 operates as follows. First, the first switch element 11 and the fourth switch element 14 are turned on to make the current flow through the coil 15 via the first switch element 11 and the fourth switch element 14. Meanwhile, the induced electromotive force is detected from two ends A and B of the coil 15 so that the magnetism of the magnetic pole corresponding to the coil 15 can be determined. If the magnetism of the silicon steel sheets has to be changed, the control circuit 1 turns on the second switch element 12 and the third switch element 13 so that the current flows through the coil 15 in a different direction and the magnetism of the silicon steel sheet is changed to continue to push the rotor of the motor.

Because the magnetism of the silicon steel sheets has to be continuously changed, the control circuit 1 must detect the induced electromotive force of the coil 15 at the two ends A and B of the coil 15 so that the motor can operate according to the induced electromotive force. In order to detect the induced electromotive force of the induction coil 15, the coil 15 has to be powered off for a period of time, which decreases the efficiency of the motor. In order to improve the efficiency of the motor, the control circuit 1 has to predict the rotating speed of the motor at the next time when motor starts to operate again to adjust the time from powering off to starting switching the current. However, the error of the control circuit 1 inevitably occurs, and the current cannot be immediately cut off so that the power is consumed. In addition, the noise of the motor is too high when the coil is powered on at the next time.

SUMMARY OF THE PRESENT INVENTION

In view of the foregoing, the present invention is to provide a control circuit of a sensorless motor and a control method thereof capable of effectively enhancing the efficiency and decreasing the noise.

To achieve the above, the present invention discloses a control circuit of a sensorless motor including a first coil, a second coil, a first switch circuit, a second switch circuit and an auxiliary switch circuit. The first switch circuit is electrically connected to the first coil and controls a direction of a current flowing through the first coil. The second switch circuit is electrically connected to the second coil and controls a direction of a current flowing through the second coil. The auxiliary switch circuit is electrically connected to and between the first coil and the second coil for controlling the directions of the currents flowing through the first coil and the second coil by cooperating with the first switch circuit and the second switch circuit.

To achieve the above, the present invention also discloses a control method of a control circuit of a sensorless motor. The control method includes the steps of: alternately turning on the first switch circuit, the second switch circuit and the auxiliary switch circuit to make the control circuit form a half-bridge driving mode and to make a current flow through the first coil or the second coil to start the motor; alternately turning on the first switch circuit, the second switch circuit and the auxiliary switch circuit to make the control circuit form a full-bridge driving mode and to make the current flow through the first coil and the second coil; applying the current through the first coil or the second coil when the control circuit is in the full-bridge driving mode; and repeating the step of making the control circuit form the full-bridge driving mode so as to keep the motor operating.

As mentioned above, the control circuit and the control method of the present invention utilize the auxiliary switch circuit to switch the motor to operate in the half-bridge driving mode or the full-bridge driving mode. When the motor is initially started, the half-bridge driving mode is adopted to overcome the ultra high noise of the motor. After the motor has operated at the stable rotating speed, the full-bridge driving mode is utilized to enhance the efficiency of the motor so that the control circuit has double advantages.

BRIEF DESCRIPTION OF THE DRAWINGS

The present invention will become more fully understood from the detailed description and accompanying drawings, which are given for illustration only, and thus are not limitative of the present invention, and wherein:

FIGS. 5 to 10 are schematic illustrations showing that the control circuit of the sensorless motor operates in a full-bridge driving mode according to the preferred embodiment of the present invention.

DETAILED DESCRIPTION OF THE INVENTION

The present invention will be apparent from the following detailed description, which proceeds with reference to the accompanying drawings, wherein the same references relate to the same elements.

Figure 1:
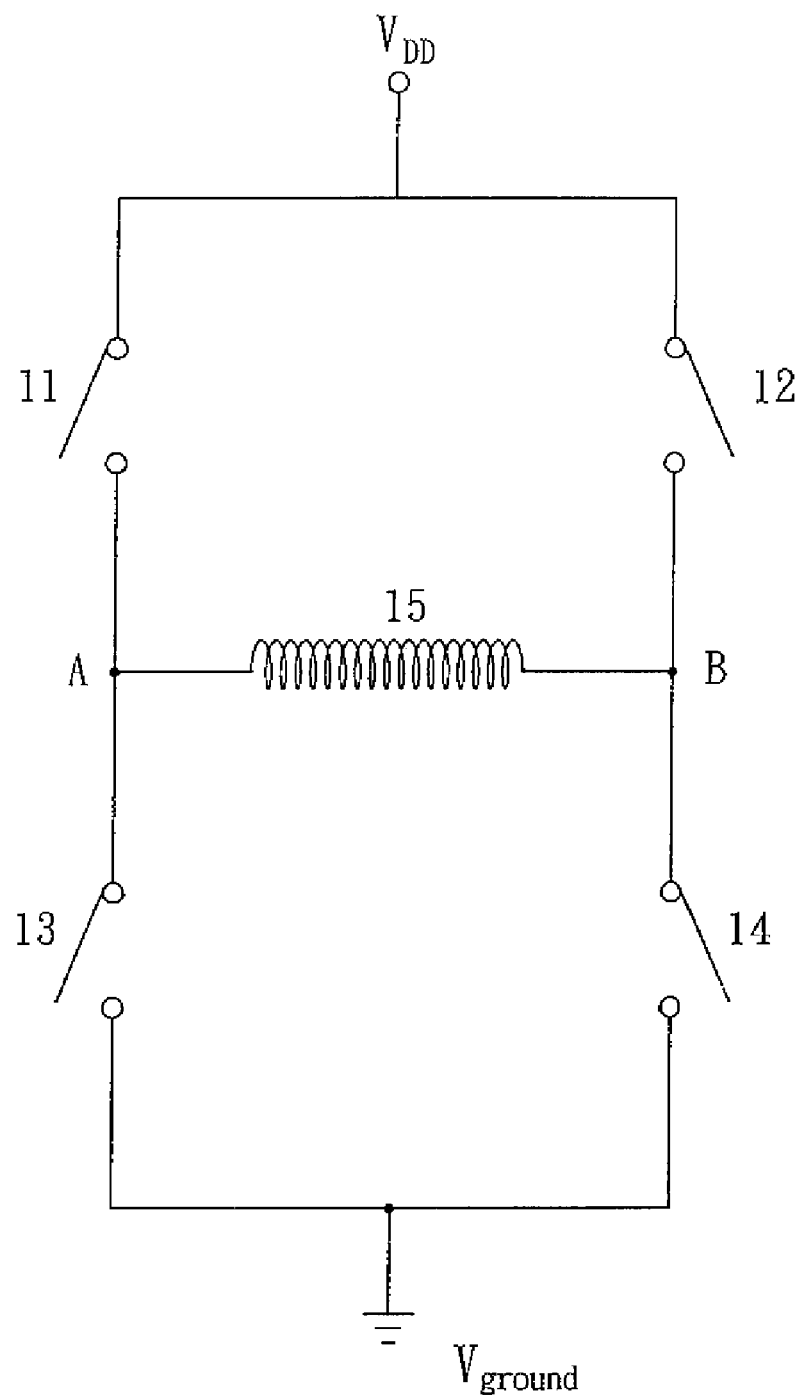
FIG. 1 is a schematic illustration showing a conventional control circuit of a sensorless motor.
Figure 2:
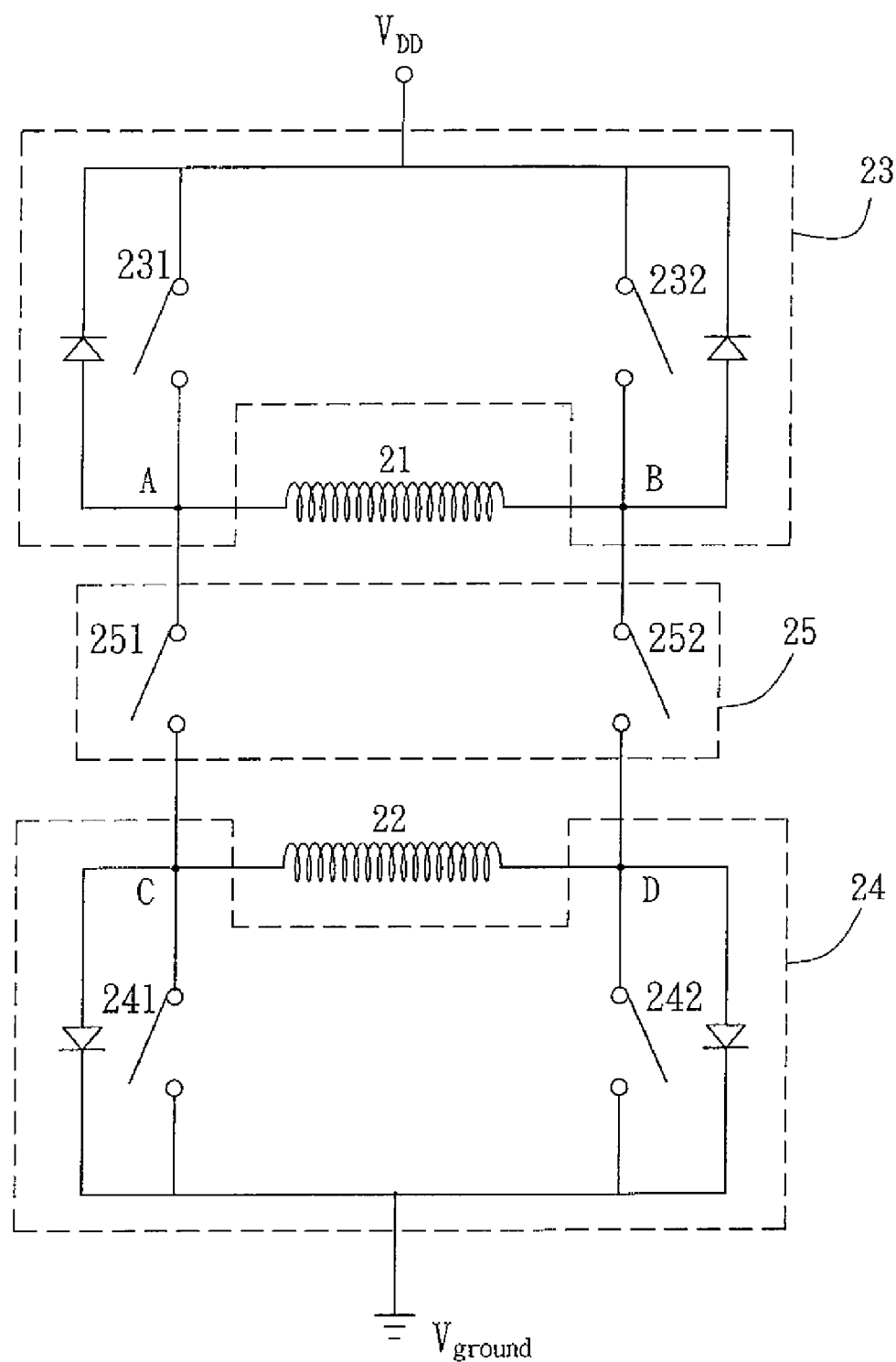
FIG. 2 is a schematic illustration showing a control circuit of a sensorless motor according to a preferred embodiment of the present invention.

FIG. 2 is a schematic illustration showing a control circuit 2 of a sensorless motor according to a preferred embodiment of the present invention. Referring to FIG. 2, the control circuit 2 includes a first coil 21, a second coil 22, a first switch circuit 23, a second switch circuit 24 and an auxiliary switch circuit 25.

The first switch circuit 23 includes a first switch element 231 and a second switch element 232. The first switch element 231 is electrically connected to a first end A of the first coil 21, and the second switch element 232 is electrically connected to a second end B of the first coil 21.

In addition, the first switch circuit 23 further includes a first diode 233 and a second diode 234. The first diode 233 is electrically connected to the first switch element 231 in parallel, and the second diode 234 is also electrically connected to the second switch element 232 in parallel.

The second switch circuit 24 includes a third switch element 241 and a fourth switch element 242. The third switch element 241 is electrically connected to a first end C of the second coil 22, and the fourth switch element 242 is electrically connected to a second end D of the second coil 22.

In addition, the second switch circuit 24 further includes a third diode 243 and a fourth diode 244, the third diode 243 is electrically connected to the third switch element 241 in parallel, and the fourth diode 244 is electrically connected to the fourth switch element 242 in parallel.

The auxiliary switch circuit 25 includes a first auxiliary switch element 251 and a second auxiliary switch element 252. The first auxiliary switch element 251 is electrically connected to the first switch circuit 23 and the second switch circuit 24. Similarly, the second auxiliary switch element 252 is electrically connected to the first switch circuit 23 and the second switch circuit 24.

In addition, the first auxiliary switch element 251 and the second auxiliary switch element 252 can also be electrically connected to a diode (not shown) in series to ensure the flowing direction of the current.

In addition, the control circuit 2 further includes a power terminal $V_{DD}$ and a ground terminal $V_{ground}$. The power terminal $V_{DD}$ is electrically connected to the first switch element 231 and the second switch element 232. The ground terminal $V_{ground}$ is electrically connected to the third switch element 241 and the fourth switch element 242. The power terminal $V_{DD}$ provides the power required by the control circuit 2.

In this embodiment, each of the first auxiliary switch element 251, the second auxiliary switch element 252, the first switch element 231, the second switch element 232, the third switch element 241 and the fourth switch element 242 is a metal-oxide-semiconductor field-effect transistor (MOSFET).

In addition, the control circuit 2 further includes a processing unit (not shown), which is electrically connected to the control circuit 2 to process signals received by the control circuit 2 and responds to the signals.

In the following, the operation of the control circuit 2 will be described to make the features of the present invention clearer.

Figure 3:
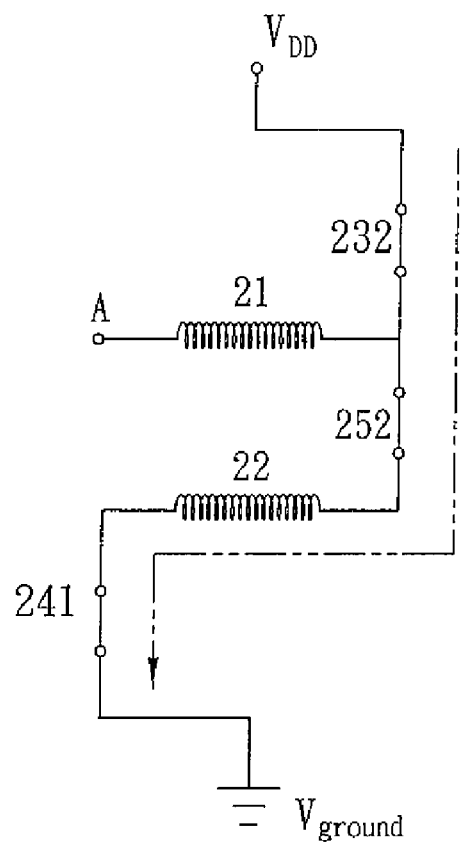
FIGS. 3 and 4 are schematic illustrations showing that the control circuit of the sensorless motor operates in a half-bridge driving mode according to the preferred embodiment of the present invention.
Figure 4:
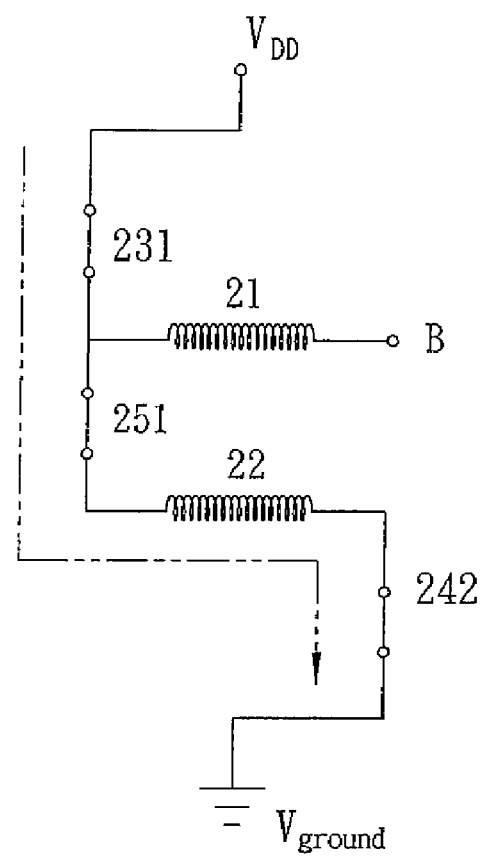

FIGS. 3 and 4 are schematic illustrations showing that the control circuit 2 of the sensorless motor operates in a half-bridge driving mode according to the preferred embodiment of the present invention. As shown in FIGS. 3 and 4, the control circuit 2 operates in the half-bridge driving mode to decrease the starting noise when the motor is initially started. According to the half-bridge driving mode of the control circuit 2, the second switch element 232, the second auxiliary switch element 252 and the third switch element 241 are turned on to make the current flow from the power terminal $V_{DD}$ to the ground terminal $V_{ground}$, while the processing unit detects a first sensing signal at the first end A of the first coil 21 and determines whether the current of the control circuit 2 has to be switched. If the processing unit has detected the first sensing signal, the first switch element 231, the first auxiliary switch element 251 and the fourth switch element 242 are turned on to make the current flow from the power terminal $V_{DD}$ to the ground terminal $V_{ground}$. Meanwhile, the processing unit detects a second sensing signal at the second end B of the first coil 21 and determines whether the current of the control circuit 2 has to be switched.

In addition, if the processing unit cannot detect the first sensing signal, the second switch element 232, the second auxiliary switch element 252 and the third switch element 241 are kept turning on. Similarly, if the processing unit has detected the second sensing signal, the second switch element 232, the second auxiliary switch element 252 and the third switch element 241 are turned on in a manner similar to that mentioned hereinabove. If the second sensing signal cannot be detected, the first switch element 231, the first auxiliary switch element 251 and the fourth switch element 242 are kept turning on.

It is to be noted that the first sensing signal and the second sensing signal are induced electromotive forces of the first coil 21.

As mentioned hereinabove, the control circuit 2 repeats the above-mentioned operations until the motor controlled thereby operates in a stable rotating speed. Thereafter, the processing unit switches the control circuit 2 to operate in a full-bridge driving mode to enhance the efficiency of the motor. The full-ridge driving mode will be described in the following.

Figure 5:
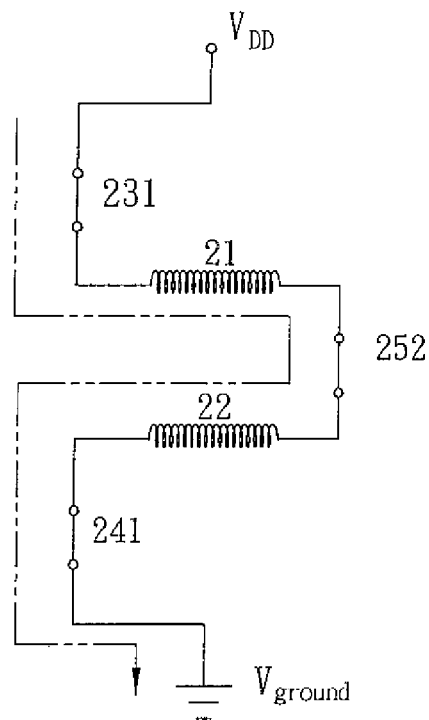
Figure 6:
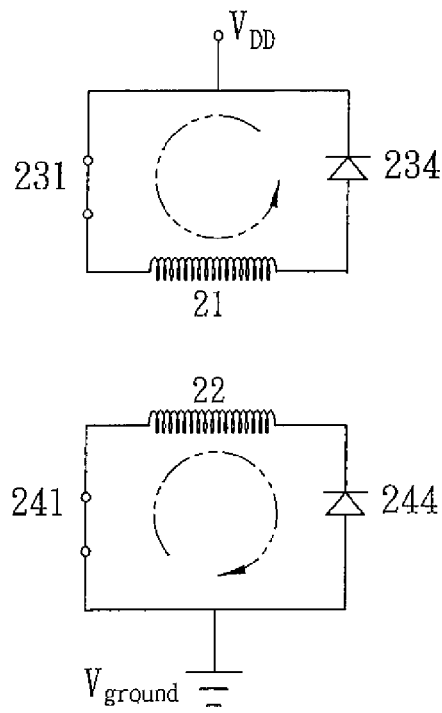

FIGS. 5 to 10 are schematic illustrations showing that the control circuit 2 of the sensorless motor operates in the full-bridge driving mode according to the preferred embodiment of the present invention. As shown in FIG. 5, the processing unit turns on the first switch element 231, the second auxiliary switch element 252 and the third switch element 241 at a first driving time to make the current flow from the power terminal $V_{DD}$ to the ground terminal $V_{ground}$. As shown in FIG. 6, the processing unit turns on the first switch element 231 and the third switch element 241 at a second driving time. Thus, the first switch element 231 and the second diode 234 form a closed loop, and the third switch element 241 and the fourth diode 244 form a closed loop so as to remove the residual current of the control circuit during the first driving time. It is to be noted that the second switch element 232 and the fourth switch element 242 can be turned on or off during this driving time period without influencing the generation of the closed loops. Furthermore, the second diode 234 and the fourth diode 244 can be omitted and replaced by the equivalent diodes in the second switch element 232 and the fourth switch element 242.

Figure 7:
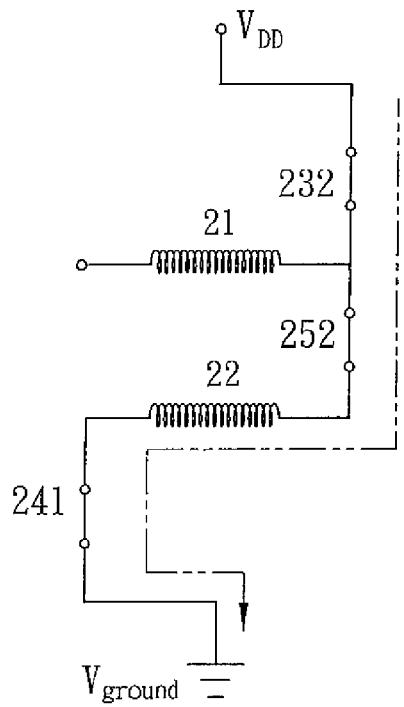

Next, as shown in FIG. 7, the second switch element 232, the second auxiliary switch element 252 and the third switch element 241 are turned on at a third driving time to make the current flow from the power terminal $V_{DD}$ to the ground terminal $V_{ground}$, while the processing unit detects a third sensing signal at the first end A of the first coil 21.

Similarly, if the processing unit has detected the third sensing signal, the second switch element 232, the first auxiliary switch element 251 and the fourth switch element 242 are turned on at a fourth driving time to make the current flow from the power terminal $V_{DD}$ to the ground terminal $V_{ground}$, as shown in FIG. 8. Next, as shown in FIG. 9, the processing unit turns on the second switch element 232 to form a closed loop together with the first diode 233 at a fifth driving time. Similarly, the processing unit also turns on the fourth switch element 242 to form a closed loop together with the third diode 243 to remove the residual current of the control circuit 2 during the fifth driving time. It is to be additionally noted that the first switch element 231 and the third switch element 241 can be turned on or off during the driving time period without influencing the generation of the closed loops. Furthermore, the first diode 233 and the third diode 243 can be omitted and replaced by the equivalent diodes in the first switch element 231 and the third switch element 241.

As shown in FIG. 10, the first switch element 231, the first auxiliary switch element 251 and the fourth switch element 242 are turned on at a sixth driving time to make the current flow from the power terminal $V_{DD}$ to the ground terminal $V_{ground}$, while the processing unit detects a fourth sensing signal at the second end B of the first coil 21.

At this time, if the processing unit has detected the fourth sensing signal, the processing unit turns on the first switch element 231, the second auxiliary switch element 252 and the third switch element 241 to make the current flow from the power terminal $V_{DD}$ to the ground terminal $V_{ground}$. If the fourth sensing signal cannot be detected, the first switch element 231, the first auxiliary switch element 251 and the fourth switch element 242 are kept turning on.

As mentioned hereinabove, the control circuit 2 starts the motor in the half-bridge driving mode and then continuously operates in the full-bridge driving mode to keep the motor rotating. Thus, it is possible to achieve the effects of decreasing the starting noise in the half-bridge driving mode and increasing the operating efficiency in the full-bridge driving mode according to the control circuit 2.

Figure 11:
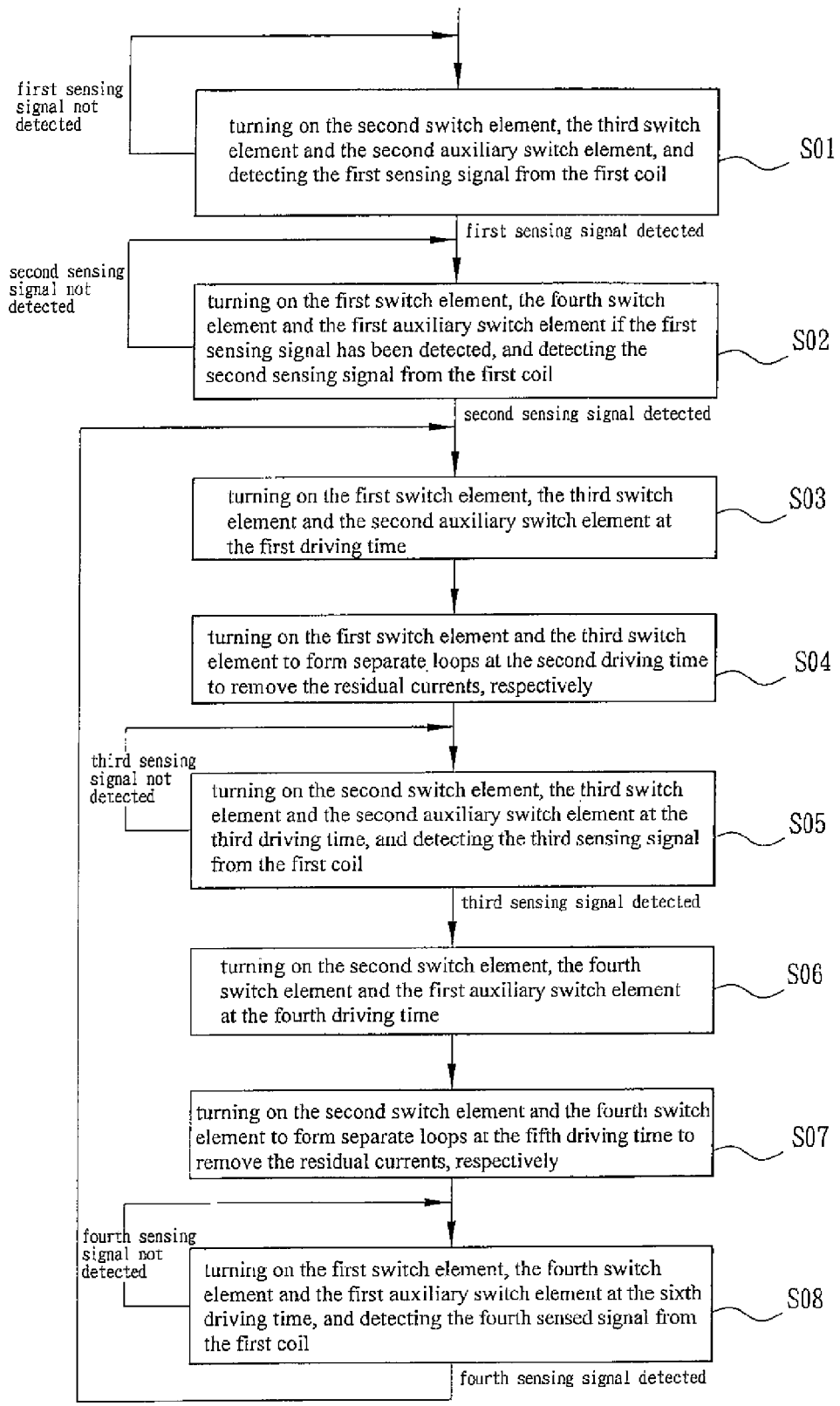
FIG. 11 is a flow chart showing a control method of the control circuit of the sensorless motor according to the preferred embodiment of the present invention.

FIG. 11 is a flow chart showing a control method of the control circuit of the sensorless motor according to the preferred embodiment of the present invention. Herein, the control method of the control circuit 2 will be illustrated in the following example.

After the processing unit outputs a command to start the motor, the starting operating method of the control circuit 2 includes the following steps.

In step S01, the second switch element 232, the third switch element 241 and the second auxiliary switch element 252 are turned on, and the first sensing signal is to be detected from the first coil 21.

In step S02, if the first sensing signal has been detected, the first switch element 231, the fourth switch element 242 and the first auxiliary switch element 251 are turned on, and the second sensing signal is to be detected from the first coil 21. At this time, the processing unit detects whether the motor has been started and operated at the stable rotating speed. If the rotating speed is not stable, the steps S01 and S02 are repeated.

In step S03, after the motor reaches the stable rotating speed, the first switch element 231, the third switch element 241 and the second auxiliary switch element 252 are turned on at the first driving time.

In step S04, the first switch element 231 and the third switch element 241 are turned on respectively to form separate loops at the second driving time to remove the residual currents. In addition, it is also possible to select to set the second switch element 232 and the fourth switch element 242 to be turned on or off.

In step S05, the second switch element 232, the third switch element 241 and the second auxiliary switch element 252 are turned on at the third driving time, and the third sensing signal is to be detected from the first coil 21. If the third sensing signal has not been detected, the detection is continuously performed.

In step S06, if the third sensing signal has been detected, the second switch element 232, the fourth switch element 242 and the first auxiliary switch element 251 are turned on at the fourth driving time.

In step S07, the second switch element 232 and the fourth switch element 242 are turned on respectively to form separate loops at the fifth driving time to remove the residual currents. In addition, it is also possible to select to set the first switch element 231 and the third switch element 241 to be turned on or off.

In step S08, the first switch element 231, the fourth switch element 242 and the first auxiliary switch element 251 are turned on at the sixth driving time, and the fourth sensing signal is to be detected from the first coil 21. If the fourth sensing signal has not been detected, the detection is continuously performed. On the contrary, if the fourth sensing signal has been detected, the procedure goes back to the step S03 to finish one cycle of the driving method.

In summary, the control circuit of the sensorless motor of the present invention utilizes the auxiliary switch circuit to make the motor operate in the half-bridge driving mode or in the full-bridge driving mode. When the motor is initially started, the control circuit is in the half-bridge driving mode to overcome the ultra high noise of the motor. After the motor has operates at the stable rotating speed, the full-bridge driving mode is utilized to enhance the efficiency of the motor so that the control circuit has the double effects.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A control circuit of a sensorless motor, comprising:
a first coil;
a second coil;
a first switch circuit electrically connected to the first coil for controlling a direction of a current flowing through the first coil;
a second switch circuit electrically connected to the second coil for controlling a direction of a current flowing through the second coil; and
an auxiliary switch circuit electrically connected to and between the first coil and the second coil for controlling the directions of the currents flowing through the first coil and the second coil by cooperating with the first switch circuit and the second switch circuit,
wherein the first switch circuit, the second switch circuit and the auxiliary switch circuit are alternately turned on to make the control circuit form a full-bridge driving mode and to make the currents flow through both the first coil and the second coil, and the first coil and the second coil are electrically connected in series during a period of the full-bridge driving mode.

2. The control circuit according to claim 1, wherein the first switch circuit comprises a first switch element and a second switch element, the first switch element is electrically connected to a first end of the first coil, and the second switch element is electrically connected to a second end of the first coil.

3. The control circuit according to claim 2, further comprising a power terminal electrically connected to the first switch element and the second switch element, and the first switch element and the second switch element are metal-oxide-semiconductor field-effect transistors (MOSFET).

4. The control circuit according to claim 2, wherein the first switch circuit further comprises a first diode and a second diode, the first diode is electrically connected to the first switch element in parallel, and the second diode is electrically connected to the second switch element in parallel.

5. The control circuit according to claim 1, wherein the second switch circuit comprises a third switch element and a fourth switch element, the third switch element is electrically connected to a first end of the second coil, and the fourth switch element is electrically connected to a second end of the second coil.

6. The control circuit according to claim 5, further comprising a ground terminal electrically connected to the third switch element and the fourth switch element, and the third switch element and the fourth switch element are metal-oxide-semiconductor field-effect transistors (MOSFET).

7. The control circuit according to claim 5, wherein the second switch circuit further comprises a third diode and a fourth diode, the third diode is electrically connected to the third switch element in parallel, and the fourth diode is electrically connected to the fourth switch element in parallel.

8. The control circuit according to claim 1, wherein the auxiliary switch circuit comprises a first auxiliary switch element and a second auxiliary switch element, the first auxiliary switch element is electrically connected to and between the first coil and the second coil, and the second auxiliary switch element is also electrically connected to and between the first coil and the second coil.

9. The control circuit according to claim 8, wherein each of the first auxiliary switch element and the second auxiliary switch element is electrically connected to a diode in series, respectively, and the first auxiliary switch element and the second auxiliary switch element are metal-oxide-semiconductor field-effect transistors (MOSFET).

10. The control circuit according to claim 1, further comprising a processing unit electrically connected to the control circuit to control the control circuit.

11. A control method for a control circuit of a sensorless motor, wherein the control circuit comprises a first coil, a second coil, a first switch circuit, a second switch Circuit, and an auxiliary switch circuit, wherein the control method comprises steps of:
alternately turning on the first switch circuit, the second switch circuit and the auxiliary switch circuit to make the control circuit form a half-bridge driving mode and to make a current flow through the first coil or the second coil to start the motor;
alternately turning on the first switch circuit, the second switch circuit and the auxiliary switch circuit to make the control circuit form a full-bridge driving mode and to make the current flow through both the first coil and the second coil;
applying the current through the first coil or the second coil when the control circuit is in the full-bridge driving mode; and
repeating the step of making the control circuit in the full-bridge driving mode so as to keep the motor operating.

12. The control method according to claim 11, wherein:
the first switch circuit comprises a first switch element and a second switch element, wherein the first switch element is electrically connected to the first coil, and the second switch element is electrically connected to the first coil;
the second switch circuit comprises a third switch element and a fourth switch element, wherein the third switch element is electrically connected to the second coil, and the fourth switch element is electrically connected to the second coil;
the auxiliary switch circuit comprises a first auxiliary switch element and a second auxiliary switch element respectively electrically connected to and between the first and second switch circuits;
when the second switch element, the third switch element and the second auxiliary switch element are turned on, a first sensing signal is to be detected from the first coil; and
if the first sensing signal has been detected, the first switch element, the fourth switch element and the first auxiliary switch element are turned on, a second sensing signal is to be detected from the first coil, and the motor is started in the half-bridge driving mode.

13. The control method according to claim 12, wherein the first switch element, the second switch element, the third switch element, the fourth switch element, the first auxiliary switch element, and the second auxiliary switch element are metal-oxide-semiconductor field-effect transistors (MOSFET).

14. The control method according to claim 13, further comprising a step of:
repeating the step of making the control circuit in the half-bridge driving mode to start the motor when the motor has not reached a stable rotating speed.

15. The control method according to claim 13, wherein after the motor is started, the method further comprises steps of:
turning on the first switch element, the third switch element and the second auxiliary switch element at a first driving time;
turning on the first switch element and the third switch element respectively to form separate loops at a second driving time so as to remove residual currents;
turning on the second switch element, the third switch element and the second auxiliary switch element at a third driving time; and
detecting a third sensing signal from the first coil during the third driving time.

16. The control method according to claim 15, further comprising a step of:
keeping turning on the second switch element, the third switch element and the second auxiliary switch element if the third sensing signal has not been detected.

17. The control method according to claim 15, wherein each of the first sensing signal, the second sensing signal and the third sensing signal is an induced electromotive force.

18. The control method according to claim 17, wherein if the third sensing signal has been detected, the method further comprises steps of:

turning on the second switch element, the fourth switch element and the first auxiliary switch element at a fourth driving time;
turning on the second switch element and the fourth switch element to form separate loops at a fifth driving time to remove residual currents, respectively;
turning on the first switch element, the fourth switch element and the first auxiliary switch element at a sixth driving time; and
detecting a fourth sensing signal from the first coil during the sixth driving time.

19. The method according to claim 18, further comprising steps of:
   keeping turning on the first switch element, the fourth switch element and the first auxiliary switch element if the fourth sensing signal has not been detected; and
   detecting the fourth sensing signal from the first coil again.

20. The method according to claim 18, wherein the fourth sensing signal is an induced electromotive force.

* * * * *